(12) United States Patent
Moribe et al.

(10) Patent No.: US 7,272,839 B2
(45) Date of Patent: Sep. 18, 2007

(54) STORAGE MEDIUM LIBRARY AND STORAGE MEDIUM MAGAZINE

(75) Inventors: Mineo Moribe, Kawasaki (JP); Michio Matsuura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 342 days.

(21) Appl. No.: 10/876,911

(22) Filed: Jun. 25, 2004

(65) Prior Publication Data

US 2005/0185529 A1  Aug. 25, 2005

(30) Foreign Application Priority Data

Feb. 20, 2004  (JP) .............................. 2004-044092

(51) Int. Cl.
*G11B 17/04* (2006.01)

(52) U.S. Cl. ...................................... 720/677

(58) Field of Classification Search ................. 720/677
See application file for complete search history.

(56) References Cited

U.S. PATENT DOCUMENTS

| | | | | |
|---|---|---|---|---|
| 4,817,071 | A * | 3/1989 | Carlson et al. ............ | 369/30.6 |
| 4,819,114 | A * | 4/1989 | Bernitt et al. ............. | 360/133 |
| 5,548,571 | A * | 8/1996 | Mistretta .................... | 720/645 |
| 5,959,950 | A * | 9/1999 | Yamashita et al. ....... | 369/30.83 |
| 6,335,072 | B1 | 1/2002 | Ito ........................... | 428/64.1 |
| 6,442,127 | B2 * | 8/2002 | Suzuki et al. .......... | 369/178.01 |
| 6,614,751 | B1 | 9/2003 | Katao ......................... | 369/291 |
| 2002/0006103 | A1 | 1/2002 | Duroj ......................... | 369/273 |
| 2004/0050939 | A1 | 3/2004 | Mathias et al. ............. | 235/487 |

FOREIGN PATENT DOCUMENTS

| | | |
|---|---|---|
| JP | 10-241209 | 9/1998 |
| JP | 11-120668 | 4/1999 |
| JP | 2000-285514 | 10/2000 |
| JP | 2001-6258 | 1/2001 |
| JP | 2002-534756 | 10/2002 |
| JP | 2003-527723 | 9/2003 |

\* cited by examiner

*Primary Examiner*—Hoa T. Nguyen
*Assistant Examiner*—Mark Blouin
(74) *Attorney, Agent, or Firm*—Greer, Burns & Crain, Ltd.

(57) ABSTRACT

A storage medium library retains polygonal data storage plates. The library includes a box for accommodating the plates, a drive unit for recording or retrieving data with respect to each storage plate, and a plate changer for transferring the storage plates between the changer and the drive unit. Each storage plate includes a recording section and a handling section surrounding the recording section. The handling section is formed with engagement recesses. The accommodation box is internally provided with support ledges which the handling sections of the storage plates contact. The plate changer includes two extendable arms for supporting the storage plates. Each extendable arm is provided with claws to be inserted into the recesses of the handling section of the transferred storage plate.

10 Claims, 16 Drawing Sheets

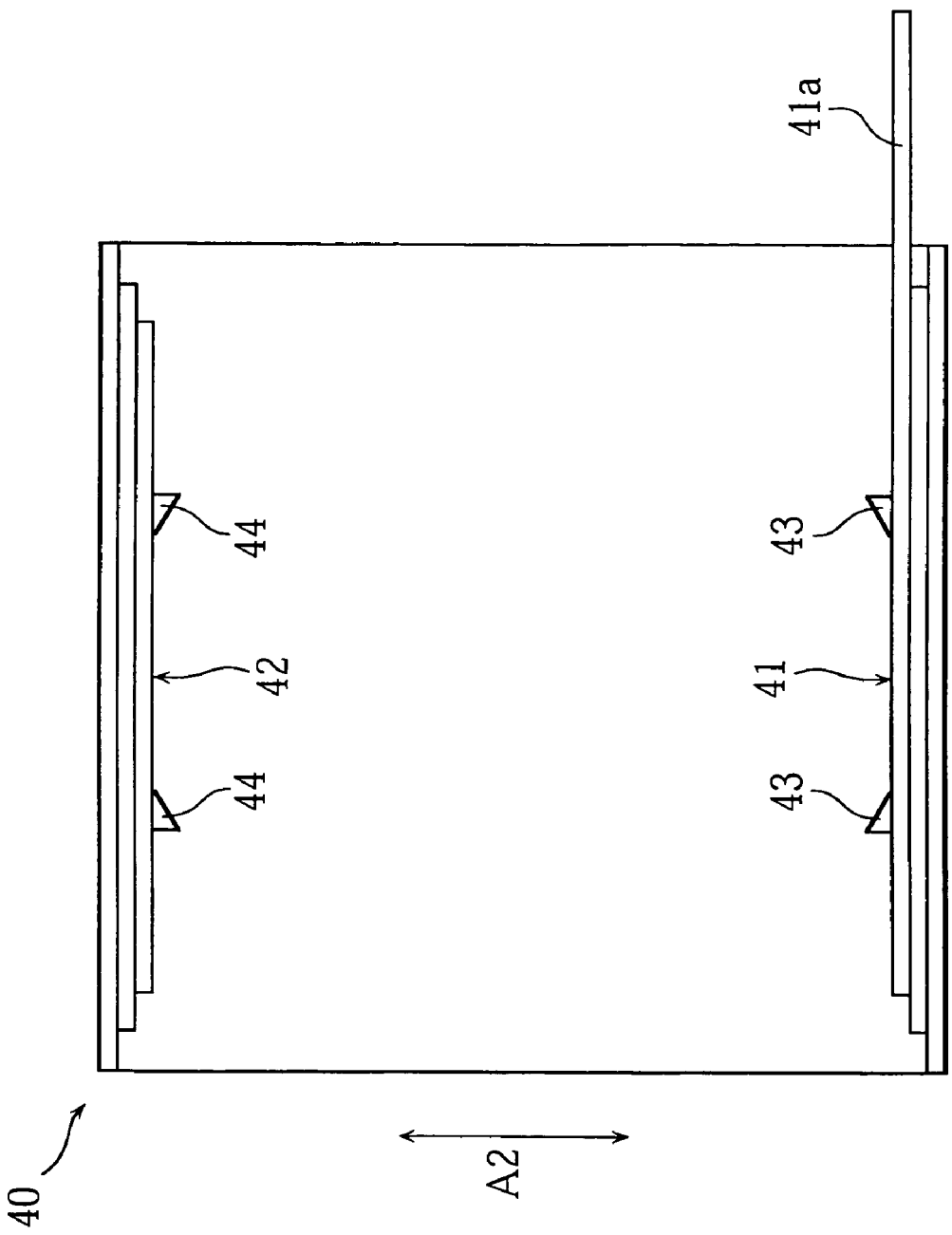

STORAGE MEDIUM LIBRARY AND STORAGE MEDIUM MAGAZINE

BACKGROUND OF THE INVENTION

1. Field of the Invention

The present invention relates to a storage medium library which can retain a plurality of data storage mediums for storing large amounts of information. It also relates to a storage medium magazine used for such a library.

2. Description of the Related Art

Automated data storage libraries are used for storing and retrieving large amounts of information in digital form. Such a library unit accommodates a plurality of storage mediums and transfers information to and from a selected one of the storage mediums. In the field of data storage libraries, a larger data storage capacity and faster data access capability are in great demand. To satisfy such demands, libraries utilizing optical disks as the storage medium are being developed. Examples of optical disk library are disclosed in JP-A-H11-120668 and JP-A-2001-6258.

An existing optical disk library may incorporate a plurality of optical disks, an accommodation unit for retaining the optical disks, a drive unit for writing data to the disks or retrieving, data from the disks, and a changer unit for moving the disks from the accommodation unit to the drive unit, and vice versa. In such a disk library, each optical disk may be placed onto a tray to be stored in the accommodation unit.

FIGS. 18 and 19 show a tray 91 and an optical disk 92 carried by the tray. Specifically, FIG. 18 is a perspective view showing the tray 91 and the disk 92 (depicted in an exploded manner for better understanding of the structure of the tray 91), while FIG. 19 is a sectional view taken along XIX-XIX line in FIG. 18, with the disk 92 directly supported on the tray 91. The tray 91 includes a disk accommodating space 91a and a circular base 91b. As shown in FIG. 19, the disk 92 is completely received into the space 91a when it is placed on the base 91b. This means that the thickness of the disk 92 is smaller than the depth of the space 91a (and hence the thickness of the tray 91).

In the conventional optical disk library of the above-described type, the storing and the handling of the disk 92 are performed in the state shown in FIG. 19, namely, with the disk 92 received into the space 91a of the tray 91. In this manner, the disk 92 is protected against mechanical damage which would otherwise occur in storing or handling the disk 92. Specifically, when the disks 92 are stored in the accommodation unit, the trays 91 (each carrying one optical disk) are brought into contact with portions of the accommodation unit, while the disks 92 are not. Likewise, when a disk 92 is transferred between the accommodation unit and the disk drive, the disk 92, retreating into the space of the tray, does not come into contact with the changer unit. Accordingly, each disk 92 is not mechanically damaged by the accommodation unit nor the changer unit.

After a tray 91 with a disk 92 carried thereon is transferred to the drive by the changer unit, the disk 92 is separated from the tray 91, to be rotated for recording or retrieving data. To attain this separation, the conventional disk library incorporates a disk-tray separation mechanism for moving the tray 91 downward. Since the disk 92 is held in position by the support of a spindle motor, the disk 92 can be separated from the tray 91 upon actuation of the separation mechanism. This conventional scheme, however, needs the disk-tray separation mechanism to be installed within the library, which is disadvantageous to providing a compact library unit.

Further, the conventional disk library incorporates a accommodation unit for holding a number of trays 91 each having a greater thickness than a disk 92 (FIG. 19). Accordingly, the accommodation unit tends to be rather large. The existence of such a accommodation unit is also disadvantageous to attaining a size reduction of the disk library.

SUMMARY OF THE INVENTION

The present invention has been proposed under the circumstances described above. It is therefore an object of the present invention to provide a storage medium library having arrangements suitable for attaining size reduction. Another object of the present invention is to provide a storage medium magazine used for such a storage medium library.

According to a first aspect of the present invention, there is provided a storage medium library comprising: a plurality of storage medium plates to be rotated for recording or retrieving information with respect to the plates; an accommodation unit for retaining the storage medium plates; a drive unit for recording or retrieving information with respect to the storage medium plates; and a plate transfer mechanism for transferring the storage medium plates between the accommodation unit and the drive unit. Each of the storage medium plates includes a recording section and a handling section formed integral with the recording section. The handling section is formed with a plurality of engagement recesses. The accommodation unit includes a plurality of support members coming into contact with the handling sections of the respective storage medium plates for supporting the storage medium plates. The transfer mechanism includes a movable unit for transferring the storage medium plates between the accommodation unit and the drive unit. The movable unit is provided with claws coming into engagement with the recesses of the handling sections of the respective storage medium plates.

Preferably, each of the storage medium plates may include a first surface, a second surface opposite to the first surface, and a plurality of side surfaces extending between the first surface and the second surface. The recoding section of each storage medium plate may be circular, and the handling section may surround the circular recording section.

Preferably, each of the recesses in the handling section of each storage medium plate may be open both in a corresponding one of the side surfaces and in the second surface of the plate. Alternatively, each of the recesses may be open only in the second surface of the plate.

Preferably, the first and the second surfaces of each storage medium plate may be a regular polygon having an even number of sides. For instance, the regular polygon may be hexagonal or octagonal.

Preferably, in each storage medium, the engagement recesses may be allotted equally to the respective sides of the polygon, so that each side of the polygon is accompanied by the same number of recesses.

Preferably, the movable unit of the transfer mechanism may include a first arm and a second arm each of which is provided with claws coming into engagement with the recesses in the handling section of each storage medium plate. The first arm and the second arm are both extendable toward the accommodation unit and the drive unit.

Preferably, the first arm may be provided with an extension used for adjusting the posture of the storage medium plate supported on the drive unit. To this end, the extension projects beyond the second arm toward the drive unit so that the extension comes into contact with the storage medium plate earlier than the second arm.

According to a second aspect of the present invention, there is provided a storage medium magazine used for a storage medium library. The magazine comprises: a plurality of storage medium plates to be rotated for recording or retrieving information with respect to the plates; and an accommodation unit for retaining the storage medium plates. Each storage medium plate comprises a recording section and a handling section formed integral with the recording section. The handling section is formed with a plurality of recesses into which claws are inserted when the storage medium plate is transferred. The accommodation unit is provided with supporting members coming into contact with the handling sections of the respective storage medium plates for supporting the plates.

Other features and advantages of the present invention will become apparent from the detailed description given below with reference to the accompanying drawings.

BRIEF DESCRIPTION OF THE DRAWINGS

FIG. 6 is a plan view showing a plate changer used for the storage medium library of FIG. 1;

DETAILED DESCRIPTION OF THE PREFERRED EMBODIMENTS

Preferred embodiments of the present invention will be described below with reference to the accompanying drawings.

Figure 1:
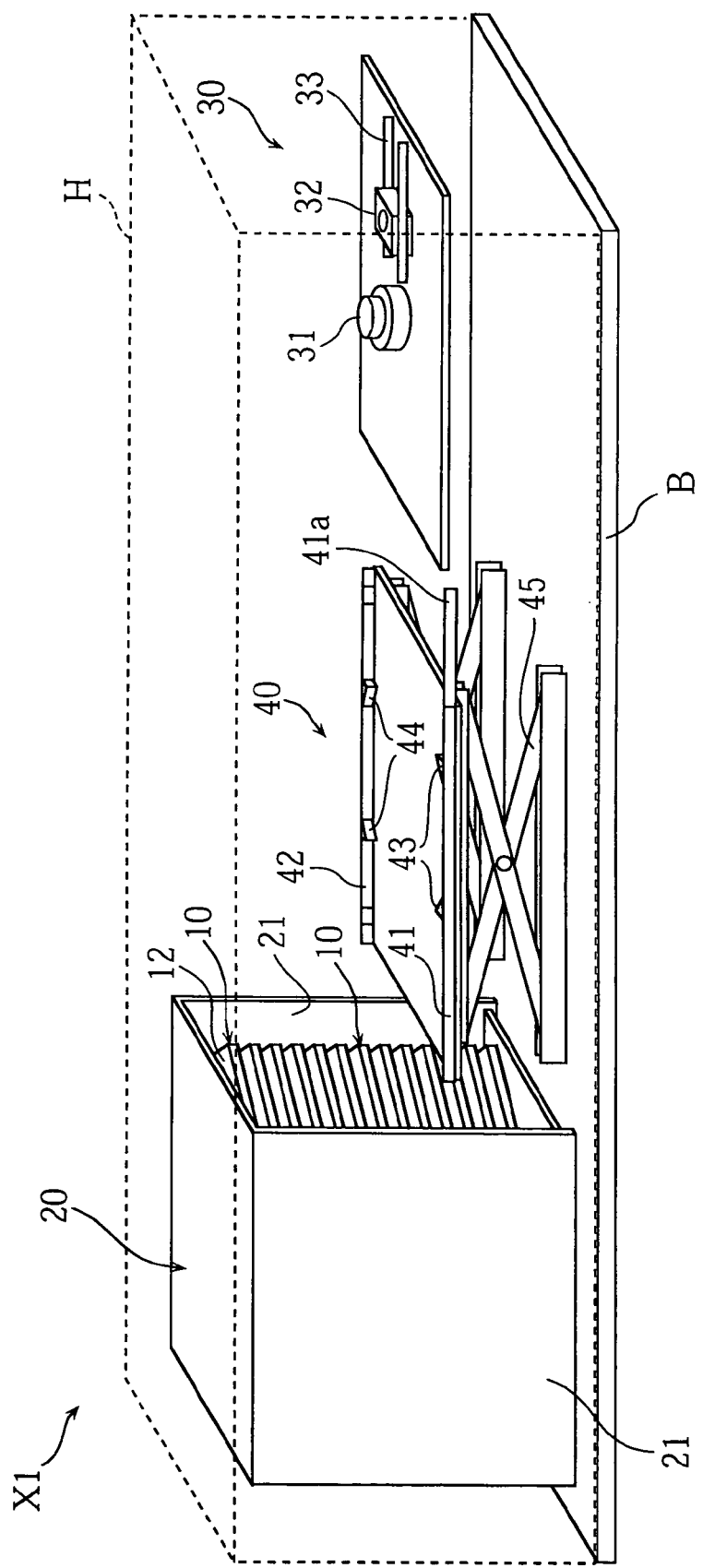
FIG. 1 is a perspective view showing a storage medium library according to a first embodiment of the present invention.

FIG. 1 shows a storage medium library according to a first embodiment of the present invention. The illustrated library X1 includes a plurality of storage medium plates 10, an accommodation box 20, a drive unit 30, a changer unit 40, a base B and a library housing H.

Figure 2:
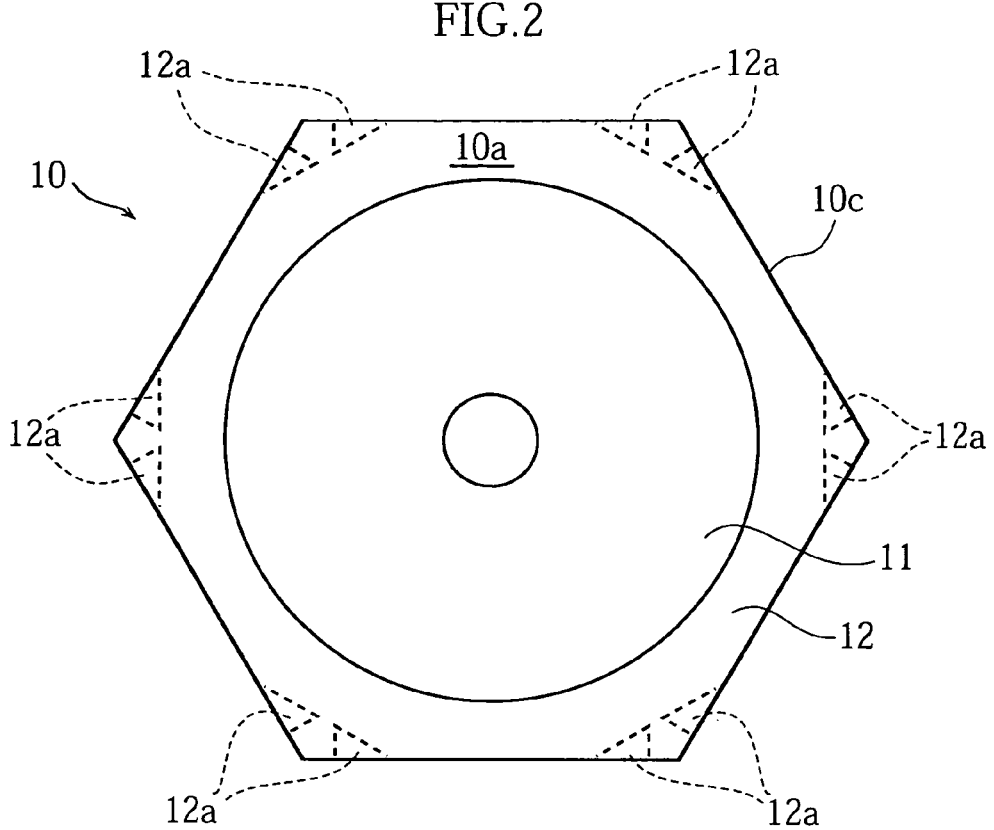
FIG. 2 is a plan view showing the upper side of a storage medium plate used for the library shown in FIG. 1.
Figure 3:
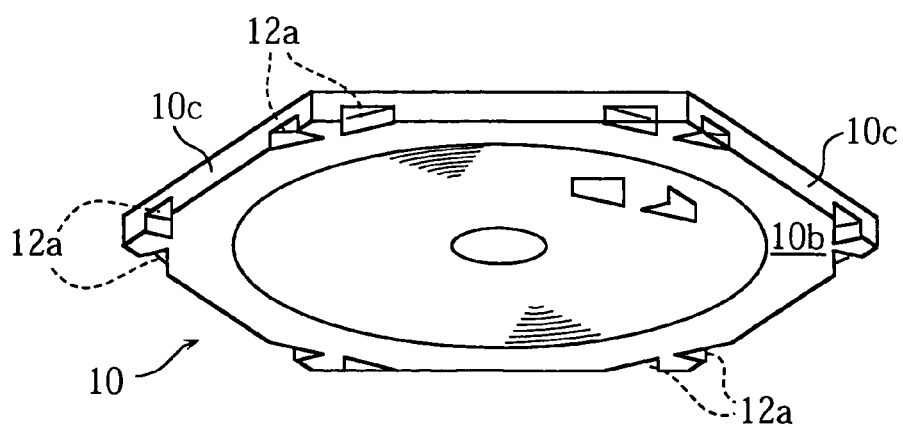
FIG. 3 is a perspective view showing the lower side of the plate shown in FIG. 2.

FIGS. 2 and 3 show a storage medium plate 10. FIG. 2 is a plan view showing the upper side of the plate 10, while FIG. 3 is a perspective view showing the lower side of the plate 10. The illustrated plate 10 includes a first surface 10a, a second surface 10b opposite to the first surface 10a, and six side surfaces 10c extending between the first and the second surfaces. In terms of function, the plate 10 includes a circular (disk-like) recording section 11 and a handling section 12 surrounding the recording section 11. The recording section 11 is provided with the same or similar structure as a conventionally available optical disk for storing information. Examples of optical disk may be phase change mediums (CD-RW, DVD+RW, DVD-RW), magneto-optical mediums (MO, MD), organic dye mediums (CD-R, DVD+R, DVD-R), and preformat mediums (DVD-ROM). The handling section 12 is formed integral with the recording section 11. In other words, the handling section 12 and the recording section 11 are produced as one piece. The handling section 12 is provided with a plurality of recesses 12a. In the illustrated embodiment, the handling section 12 has the same thickness as the recording section 11. However, according to the present invention, the handling section 12 may have a smaller thickness than the recording section 11. As shown in FIG. 2, the storage medium plate 10 (hence the periphery of the handling section 12) is regularly hexagonal. Two recesses 12a are formed for each side of the hexagon. Each recess 12a is open to the exterior in the second surface 10b and in a side surface 10c.

The above-described storage medium plate 10 may be produced by a known method used for making optical disks. Specifically, a regularly hexagonal resin plate having a prescribed thickness is formed by injection molding. In this process, the region of the resulting plate that will be processed into the recording section 11 is formed with irregularities as the surface of a conventional optical disk. Finally, several layers are sequentially formed in a prescribed area on the hexagonal plate by sputtering with appropriate materials.

The accommodation box 20 retains a plurality of storage medium plates 10. As seen from FIGS. 4 and 5, the box 20 includes a pair of side walls 21, and a plurality of ledges fixed to the side walls 21. Each ledge includes a support portion 22 and a guide portion 23, except for the uppermost ledges (right and left in FIG. 4) and the lowermost ledges (right and left). Specifically, the uppermost ledges consist of only a guide portion 23, and the lowermost ledges consist of only a support portion 22.

Figure 4:
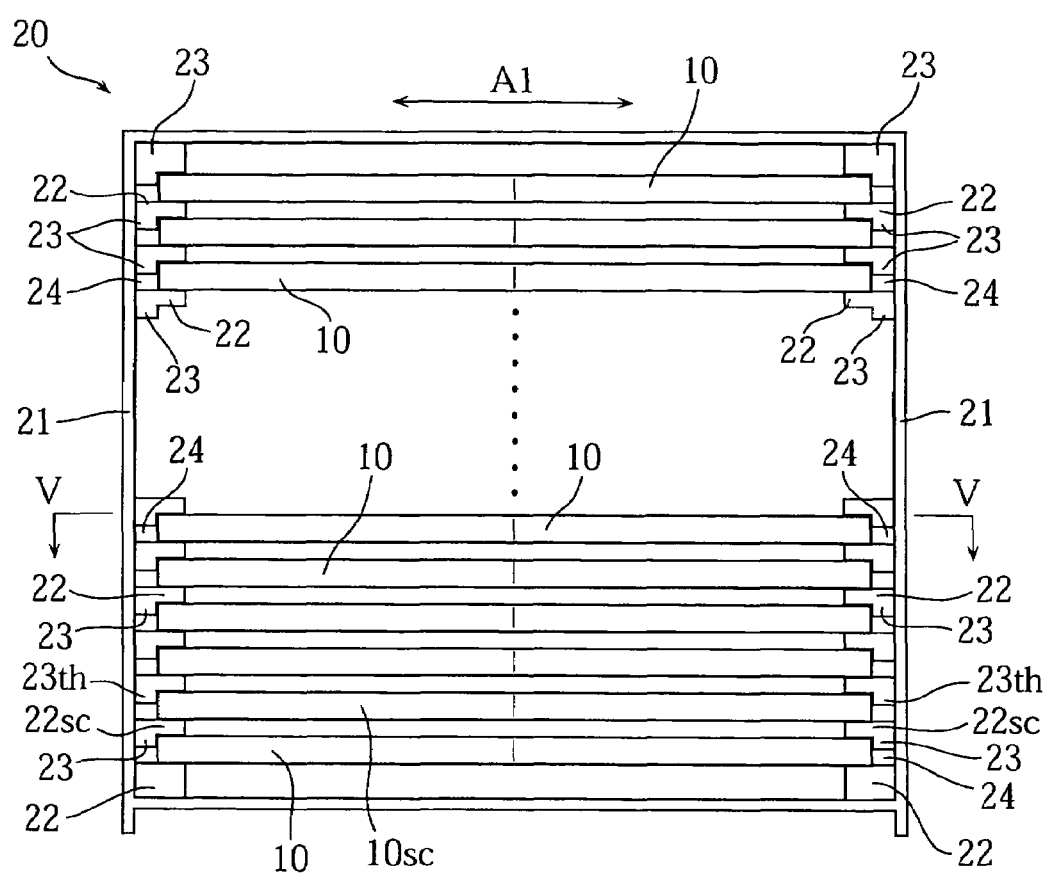
FIG. 4 is a front view showing an accommodation box used for the storage medium library of FIG. 1.
Figure 5:
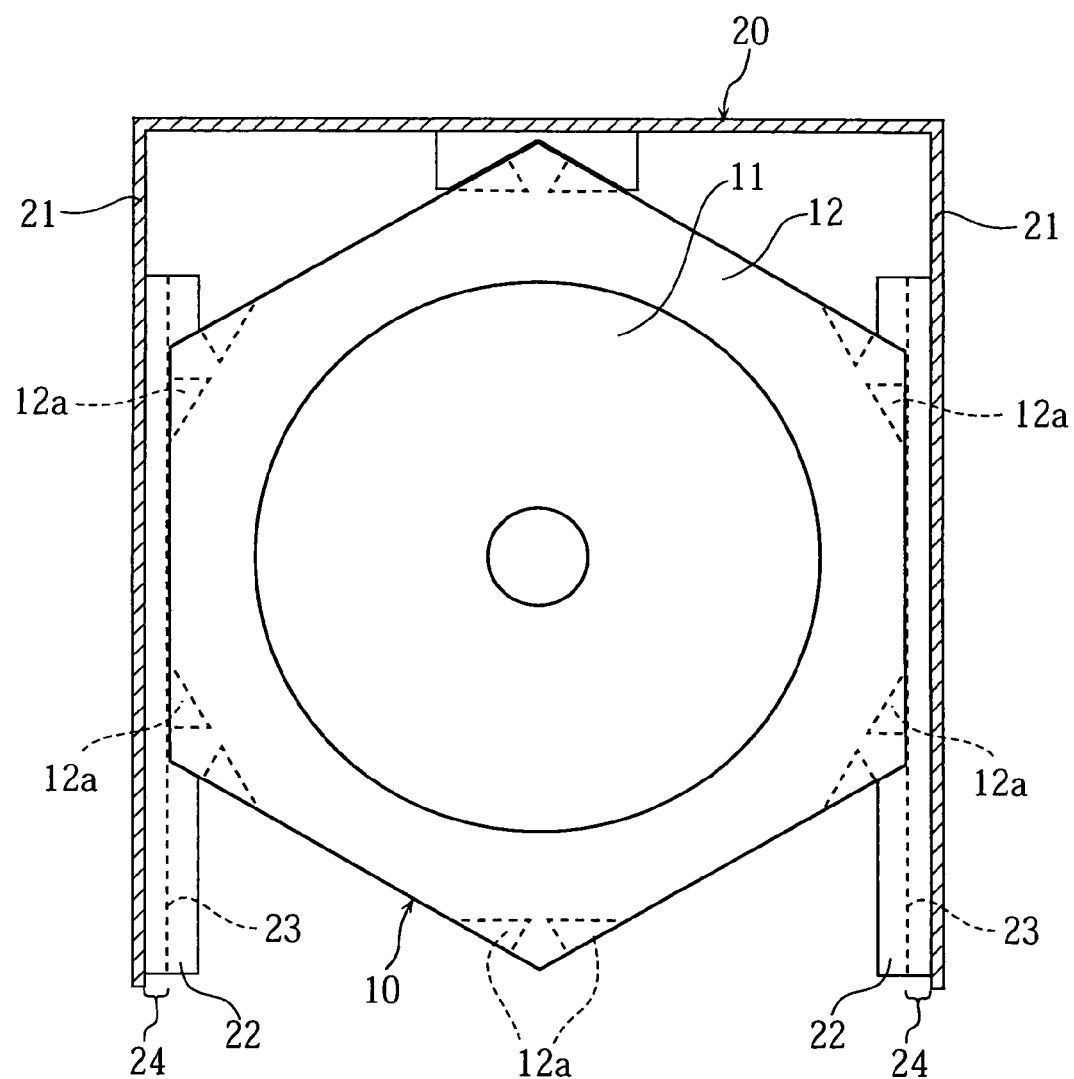
FIG. 5 is a sectional view taken along lines V-V in FIG. 4.

As shown in FIG. 4, for each storage medium plate 10, two support portion 22 come into contact with the bottom side of the handling section 12 of the plate, while two flanking guide portions 23 come into contact with the respective side surfaces 10c of the plate. The guide portions 23, between which the plate 10 is located, properly position the plate 10 in the lateral direction shown by the arrow A1. A more specific description is given below by taking the second plate 10sc (counting from the bottom) for example. As seen from FIG. 4, the second plate 10sc is supported by the support portions 22sc of the second pair of ledges (counting from the bottom), while positioned in the lateral direction A1 by the guide portions 23th of the third pair of ledges (counting from the bottom). Accordingly, the second plate 10sc is placed on the support portions 22sc and disposed between the guide portions 23th. To hold the second plate 10sc horizontally, the two support portions 22sc of the second pair of ledges are fixed at the same height.

In the accommodation box 20, each plate 10 is supported by a pair of right and left support portions 22 and laterally positioned by a pair of right and left guide portions 23, as noted above. As shown in FIG. 4, there is a space 24 provided between the vertically arranged support portion 22 of a ledge and guide portion 23 of the immediate upper ledge. As will be described below, a plate transfer arm is inserted into the space 24. According to the present invention, the accommodation box 20 and the plates 10 retained therein constitute a "storage medium magazine".

The drive unit 30 is provided for writing data to and reading data from a rotating storage medium plate 10. As shown in FIG. 1, the drive unit 30 includes a spindle motor 31, an actuator 32 and an optical head 33. In addition to these, the drive unit 30 may include some other components necessary for transferring data to and from the plate 10 in accordance with the medium type of the recording section 11 of the plate 10. The operation of the drive unit 30 is controlled by a controller not shown in the figures.

The changer unit 40, provided for moving a storage medium plate 10 from the accommodation box 20 to the drive unit 30 and vice versa, includes a pair of arms 41-42, a pair of claws 43, another pair of claws 44 and an elevating mechanism 45.

As shown in FIG. 6, each of the arms 41, 42 consists of a plurality of bars of different lengths (three bars used in the shown example). In each arm 41, 42, the bars are slidable relative to each other in the longitudinal direction of the arm, so that the arm can become longer in the forward direction (to the left in FIG. 6) or in the rearward direction (to the right). The arms 41, 42 are supported by an appropriate surface which is flat and horizontal. The arm 41 is provided with a posture adjusting extension 41a projecting beyond the arm 42 toward the drive unit 30 (to the right in FIG. 6). The two arms 41, 42 are cooperatively extendable toward the accommodation box 20 and toward the drive box 30. Such operation of the arms 41, 42 is effectuated by a driving mechanism (not shown) which in turn is controlled by the above-mentioned, non-illustrated controller.

The first set of claws 43 are movably attached to the arm 41 in the directions indicated by the two-headed arrow A2 in FIG. 6, so that the claws 43 are selectively retracted into the arm 41. Likewise, the second set of claws 44 are movably attached to the arm 42 in the A2-directions, so that the claws 44 are selectively retracted into the arm 42. Though not shown in the figure, there is provided an actuator responsible for such operation of the claws 43 and 44. In the state shown in FIG. 6, the first and the second sets of claws 43, 44 are in the "projecting position" toward the opposite arm. As will be described later, the claws 43, 44 in the projecting position come into engagement with some of the recesses 12a in the handling section 12 of a storage medium plate 10 to be transferred between the accommodation box 20 and the drive unit 30.

The elevating mechanism 45 raises or lowers the arms 41, 42 to a desired height. Such operation of the elevating mechanism 45 is effectuated by a driving mechanism not shown in the figure. This driving mechanism may be controlled by the above-mentioned, non-illustrated controller.

The accommodation box 20, the drive unit 30 and the changer unit 40 are mounted on the base B and accommodated in the library housing H. The upper surface of the base B may be formed with a wiring pattern or patterns (not shown), as required. The accommodation box 20 is removably attached to the base B so that it can be replaced with another one. The housing H may be provided with a number of terminals for external connection.

Figure 7A:
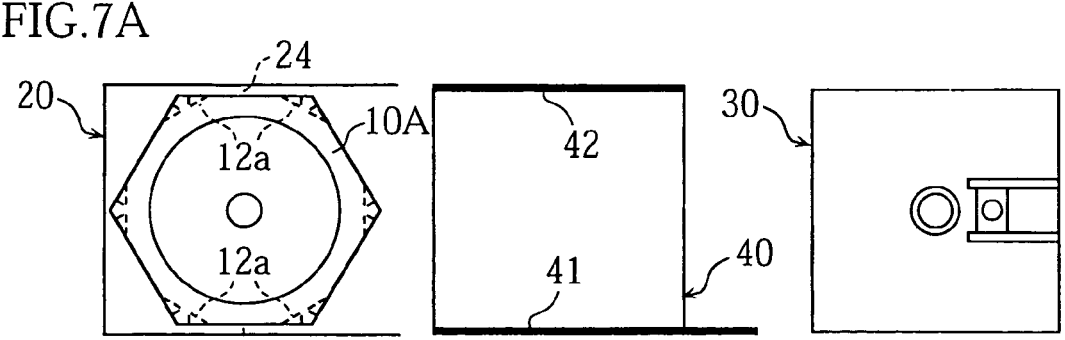
FIGS. 7A-7E illustrate how a storage medium plate is transferred from the accommodation box to the drive unit in the library shown in FIG. 1.

FIGS. 7A-7E illustrate how a selected storage medium plate 10 is transferred from the accommodation box 20 to the drive unit 30 during the operation of the library X1. Initially, as shown in FIG. 7A, the selected plate 10A to be transferred is retained in the accommodation box 20 at a certain height. This height, or the vertical location of the selected plate 10A, is detected by the non-illustrated controller, for example. Based on the detection, the changer unit 40 is moved up or down by the elevating mechanism 45 so that the arms 41, 42 of the changer 40 are brought to the height corresponding to the vertical location of the selected plate 10A.

Figure 7B:
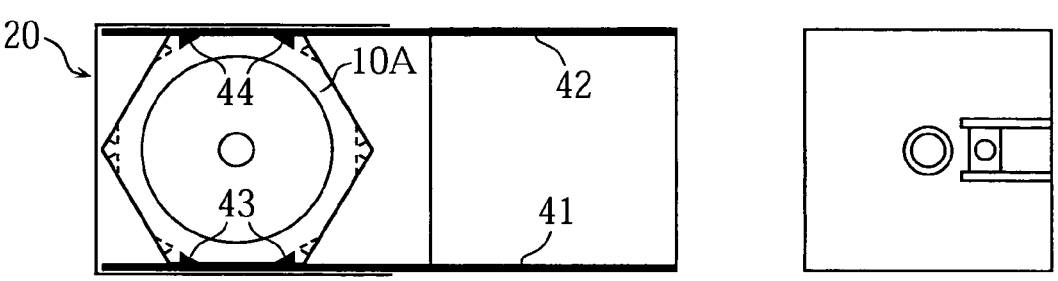

Then, as shown in FIG. 7B, the arms 41, 42 are extended synchronously into the accommodation box 20, to enable the claws 43, 44 to protrude into the recesses 12a formed in the plate 10A. More specifically, in this process, the arms 41, 42 are initially extended with the claws 43, 44 retracted into the arms. Then, after the arms 41, 42 become sufficiently long, the claws 43, 44 are caused to protrude from the arms 41, 42 to come into engagement with the recesses 12a (precisely, the four recesses 12a provided at the two sides of the hexagonal plate 10A that extend in parallel to the arms 41, 42).

Figure 7C:
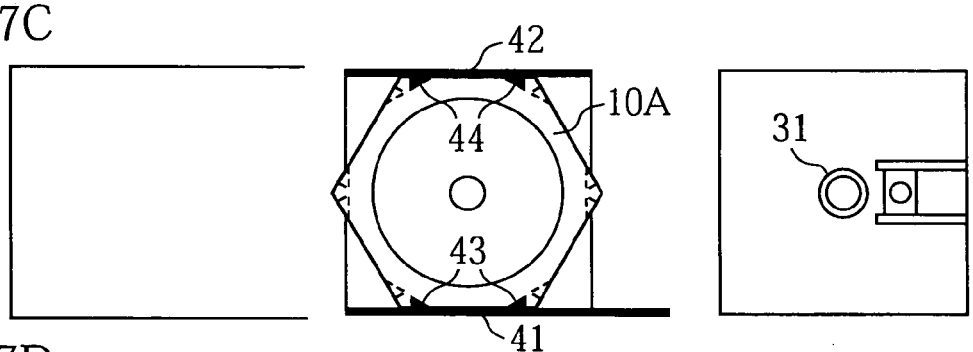

Then, as shown in FIG. 7C, the arms 41, 42 are contracted synchronously, with the claws 43, 44 kept protruding from the arms. In this process, the plate 10A is supported directly by the laterally protruding claws 43, 44.

Figure 7D:
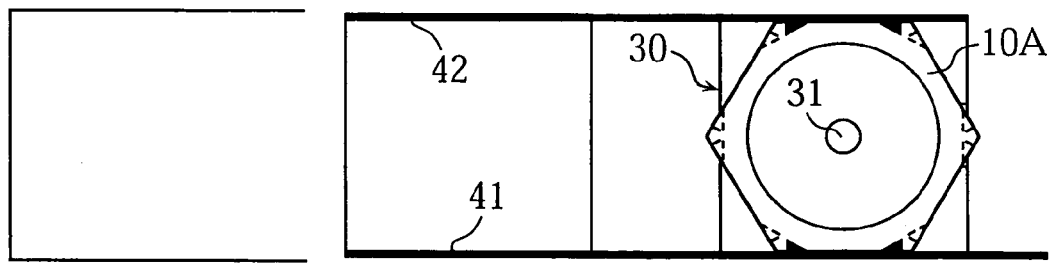

Then, as shown in FIG. 7D, the arms 41, 42 are extended toward the drive unit 30 for shifting the plate 10A to the spindle motor 31.

Figure 7E:
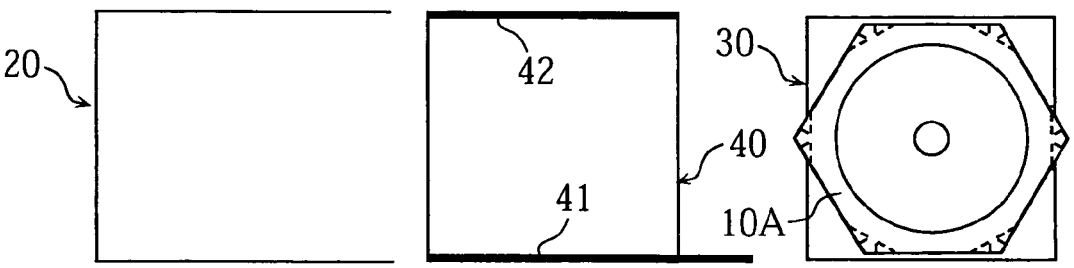

Then, after the claws 43, 44 are retracted into the arms 41, 42, the arms are contracted synchronously, as shown in FIG. 7E. Thus, the transfer of the plate 10A from the box 20 to the drive unit 30 has been completed. Thereafter, the drive unit 30 may write data to the plate or retrieve data from the plate.

FIGS. 8A-8E illustrate how the plate 10A is transferred back from the drive unit 30 to the accommodation box 20.

Figure 8A:
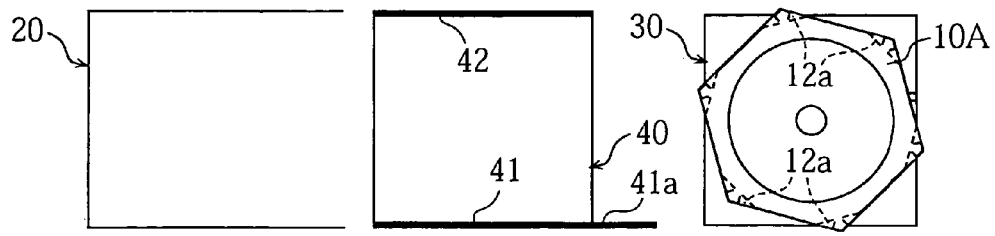
FIGS. 8A-8E illustrate how the storage medium plate is transferred back from the drive unit to the accommodation box in the library shown in FIG. 1.

In the initial state shown in FIG. 8A, the plate 10A, supported by the drive unit 30, is held at a predetermined, known height. The changer unit 40 is moved vertically by the elevating mechanism 45 to bring the arms 41, 42 to the height corresponding to the vertical location of the plate 10A.

Figure 8B:
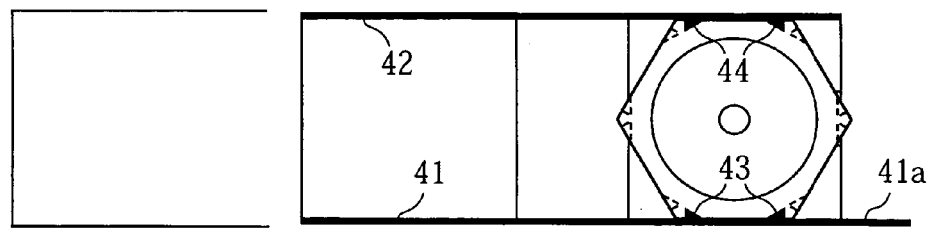

Then, as shown in FIG. 8B, the arms 41, 42 are extended synchronously, with the claws 43, 44 retracted into the arms, toward the drive unit 30 until they become long enough to enable the claws 41, 42 to come into engagement with the appropriate recesses 12a of the plate 10A. For this process, the plate 10A may initially be skew with respect to the arms 41, 42, as shown in FIG. 8A. Even in such a case, the posture adjusting extension 41a comes into contact with one side of the hexagonal plate 10A and pushes it as the arms 41, 42 become longer. Accordingly, the plate 10A is rotated about its center, to be brought into a position in which two opposite sides of the plate 10A become parallel to the arms 41, 42. This allows the plate 10A to fit into the space between the two arms 41, 42. Then, the arms 41, 42 are extended to the prescribed position in which the claws 43,. 44 can protrude into the recesses 12a of the plate 10A.

Figure 8C:
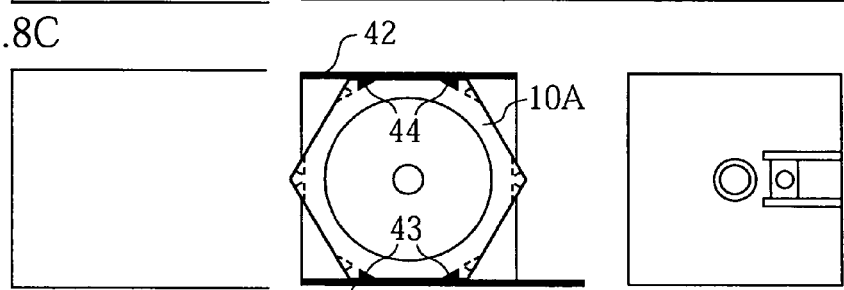

Then, as shown in FIG. 8C, the arms 41, 42 are contracted synchronously, with the claws 43, 44 protruding. Then, in accordance with the prescribed height at which the plate 10A is to be retained in the accommodation box 20, the exchanger unit 40 is raised or lowered by the elevating mechanism 45.

Figure 8D:
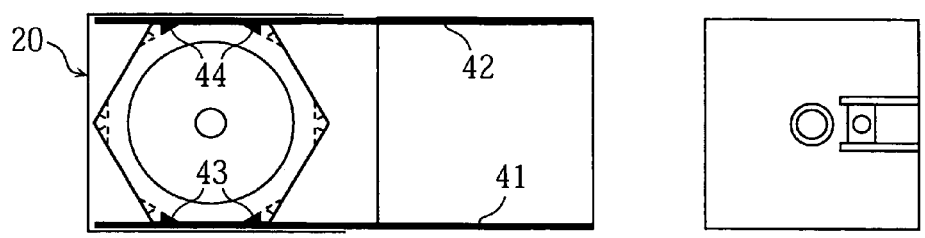

Then, as shown in FIG. 8D, the arms 41, 42 carrying the plate 10A are extended into the box 20 to shift the plate 10A to the prescribed storage location in the accommodation box 20.

Figure 8E:
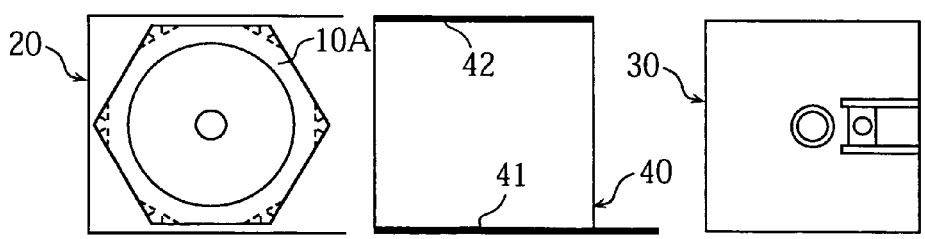

Then, with the claws 43, 44 retracted, the arms 41, 42 are contracted synchronously, as shown in FIG. 8E. Thus, the transfer of the plate 10A from the drive unit 30 to the box 20 has been completed.

Advantages of the above-described library X1 are as follows. As described above, each of the storage medium plates 10 is retained in the accommodation box 20 by its handling section 12 placed on the support portions 22 (see FIG. 4). In this manner, it is possible to prevent the recording section 11 of the storage medium plate 10 from being contacted by the support portions 22. Further, in transferring the plate 10 between the box 20 and the drive unit 30, the protruding claws 43, 44 of the changer unit 40 come into engagement with the recesses 12a, which are formed in the handling section 12 of the plate 10. At this stage again, mechanical contact with the recording section 11 is avoided. Thus, with the library X1 of the present invention, no mechanical damage is caused to the recording section 11 of the plate 10 neither in retaining the plate nor in transferring the plate.

Figure 18:
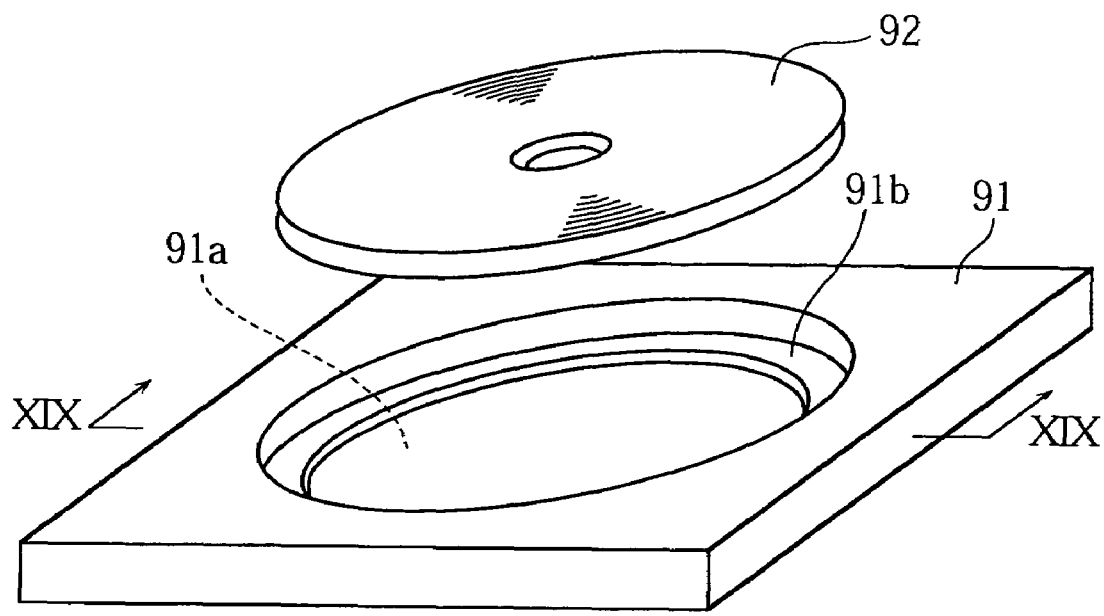
FIG. 18 is a perspective view showing a conventional optical disk and a conventional tray used for carrying the disk.
Figure 19:
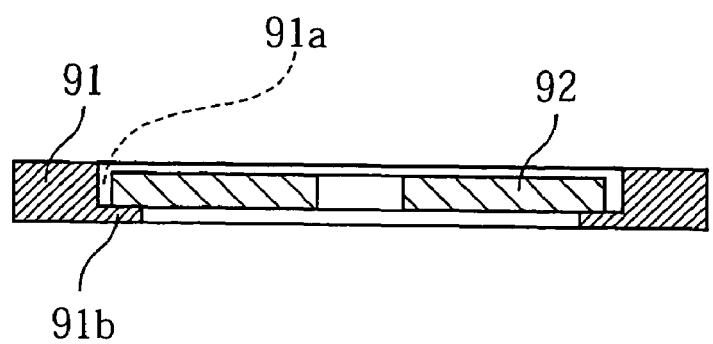
FIG. 19 is a sectional view taken along lines XIX-XIX in FIG. 18, with the disk accommodated in the space formed in the tray.

The library X1 of the present invention is also advantageous in the following respects. As noted above, the retainment and transfer of the storage medium plate 10 are effectuated by the engagement with the handling section 12, which is formed integral with the recording section 11. This arrangement, differing from the conventional arrangement, requires no tray for carrying the storage medium and hence no mechanism for separating the tray and the storage medium. In the absence of such a separation mechanism, the library X1 of the present embodiment can be compact. A further size reduction is possible with the library X1 since the accommodation box 20 incorporated therein can be compact. Specifically, as described above, the accommodation box 20 retains a number of storage medium plates 10 by themselves, i.e., without being accompanied by medium-carrying trays as the one shown in FIGS. 18 and 19. In this manner, the accommodation box 20 of the present invention can be smaller than is conventionally possible. Accordingly, the library X1 incorporating such an accommodation box can also be made compact.

Figure 9A:
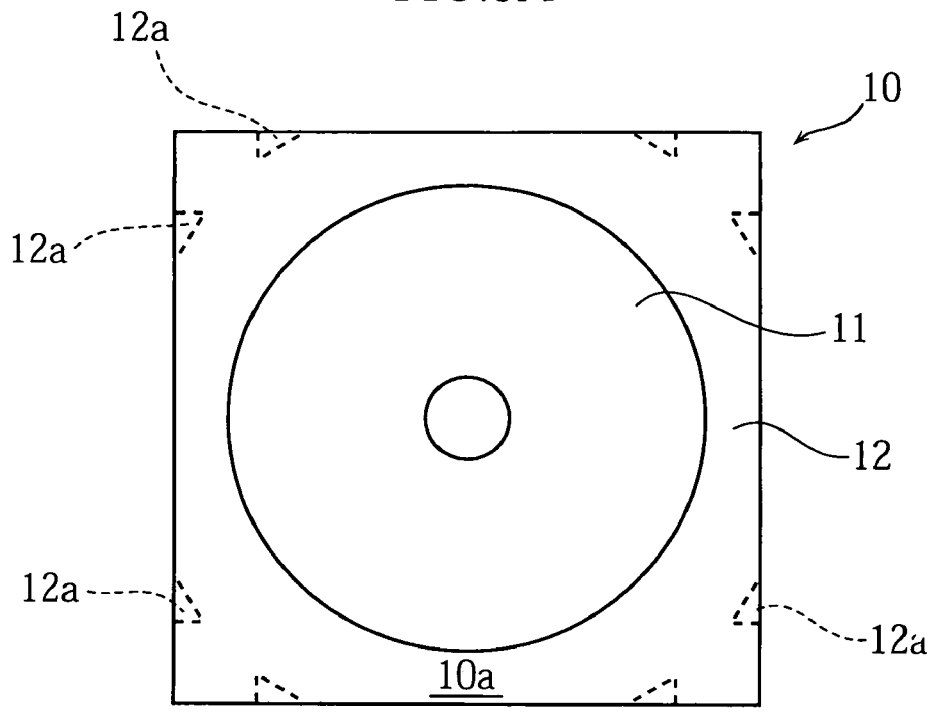
FIG. 9A is a plan view showing a square storage medium plate usable for the library of the present invention.
Figure 9B:
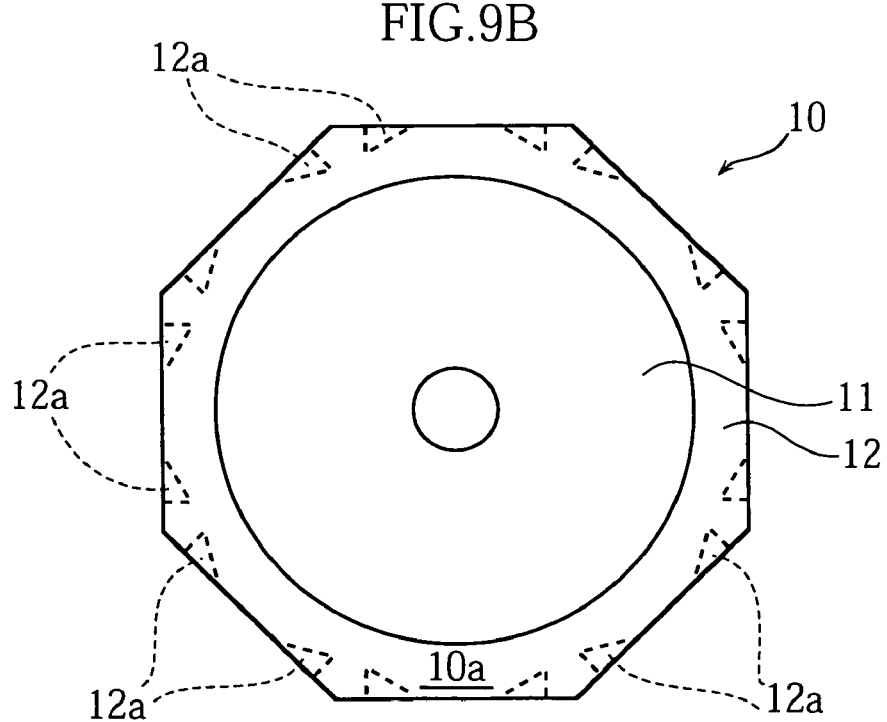
FIG. 9B is a plan view showing an octagonal storage medium plate usable for the library of the present invention.

The plate 10 shown in FIG. 2 is hexagonal, though the present invention is not limited to this. As other possible options, FIG. 9A shows a square plate 10, and FIG. 9B shows an octagonal plate 10. The square plate of FIG. 9A can be retained in the accommodation box 20 more stably than the hexagonal plate of FIG. 2, since the former has a longer side (supposing that the recording section 11 has the same surface area). The octagonal plate of FIG. 9B can be rotated in a smaller space for data recording or reading than the hexagonal plate of FIG. 2, since the former has a shorter diagonal (again, supposing that the recording section 11 has the same surface area). According to the present invention, other regular polygonal configurations (having an even number of sides) may be adopted for the plate 10.

Figure 10:
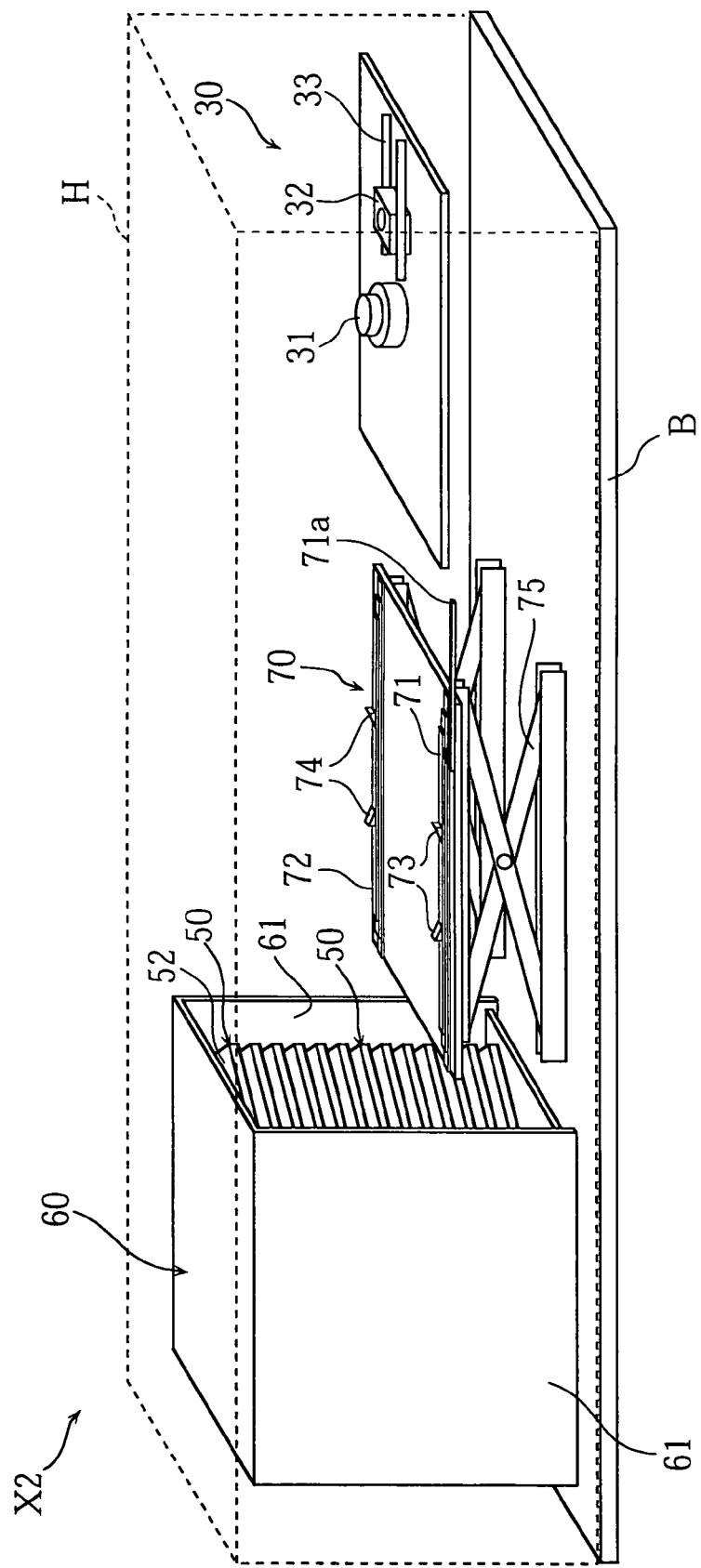
FIG. 10 is a perspective view showing a storage medium library according to a second embodiment of the present invention.

FIG. 10 illustrates a storage medium library X2 according to a second embodiment of the present invention. The library X2 includes a plurality of storage medium plates 50, an accommodation box 60, a drive unit 30, a disk changer 70, a base B and a library housing H.

Figure 11:
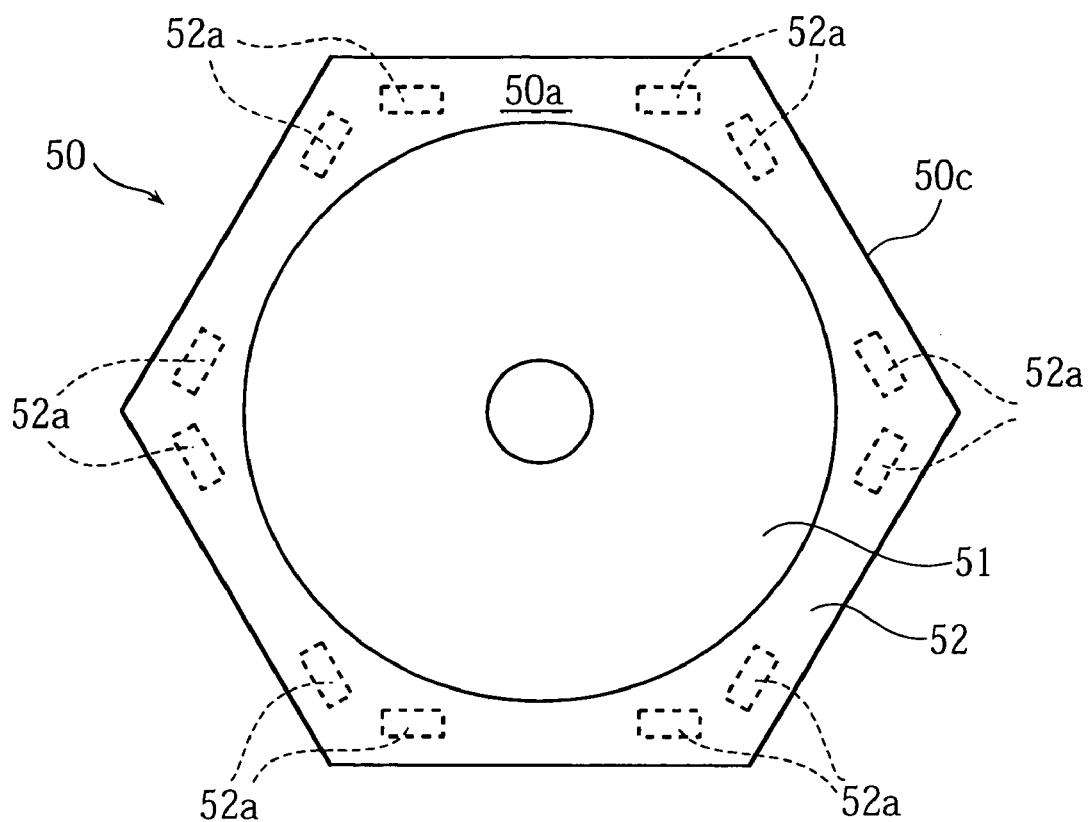
FIG. 11 is a plan view showing the upper side of a storage medium plate used for the library shown in FIG. 10.
Figure 12:
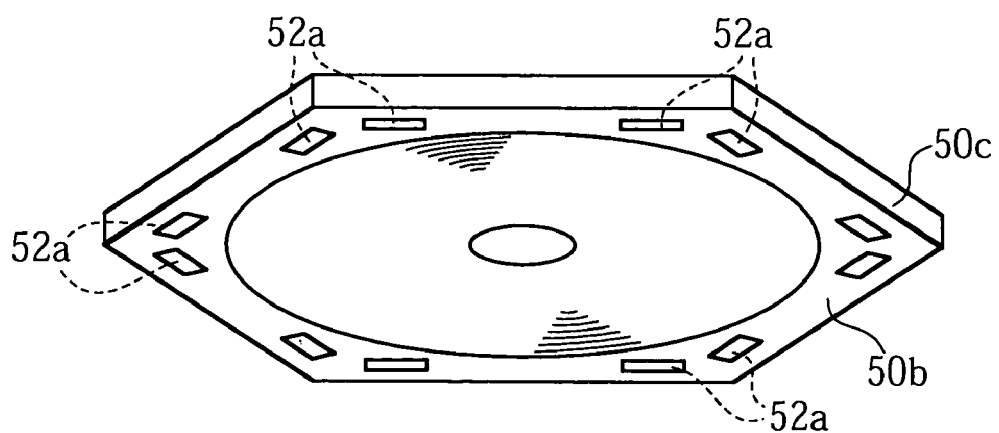
FIG. 12 is a perspective view showing the lower side of the plate shown in FIG. 11.

FIGS. 11 and 12 show a storage medium plate 50. Specifically, FIG. 11 is a plan view showing the upper side of the plate 50, while FIG. 12 is a perspective view showing the lower side of the same plate. The plate 50 has a first surface 50a, a second surface 50b opposite to the first surface, and a plurality of (six in the illustrated example) side surfaces 50c. As in the plate 10 of the above-described first embodiment, the plate 50 of the second embodiment includes a recording section 51 and a handling section 52 formed integral with the recording section 51. The handling section 52 may be the same in thickness as the recording section 51, though it is possible to make the former thinner than the latter. The handling section 52 has a hexagonal outline and is formed with twelve recesses 52a (two recesses corresponding to each side of the hexagonal). Each recess 52a is open to the exterior only in the second surface 50b of the plate 50 (cf. the recess 12a of the first embodiment is open both in the second surface 10b and in the side surface 10c of the plate 10).

The plate 50 of the second embodiment can be produced in the same manner as the plate 10 of the first embodiment. The plate 50 may have a regular polygonal configuration other than the hexagonal one.

Figure 13:
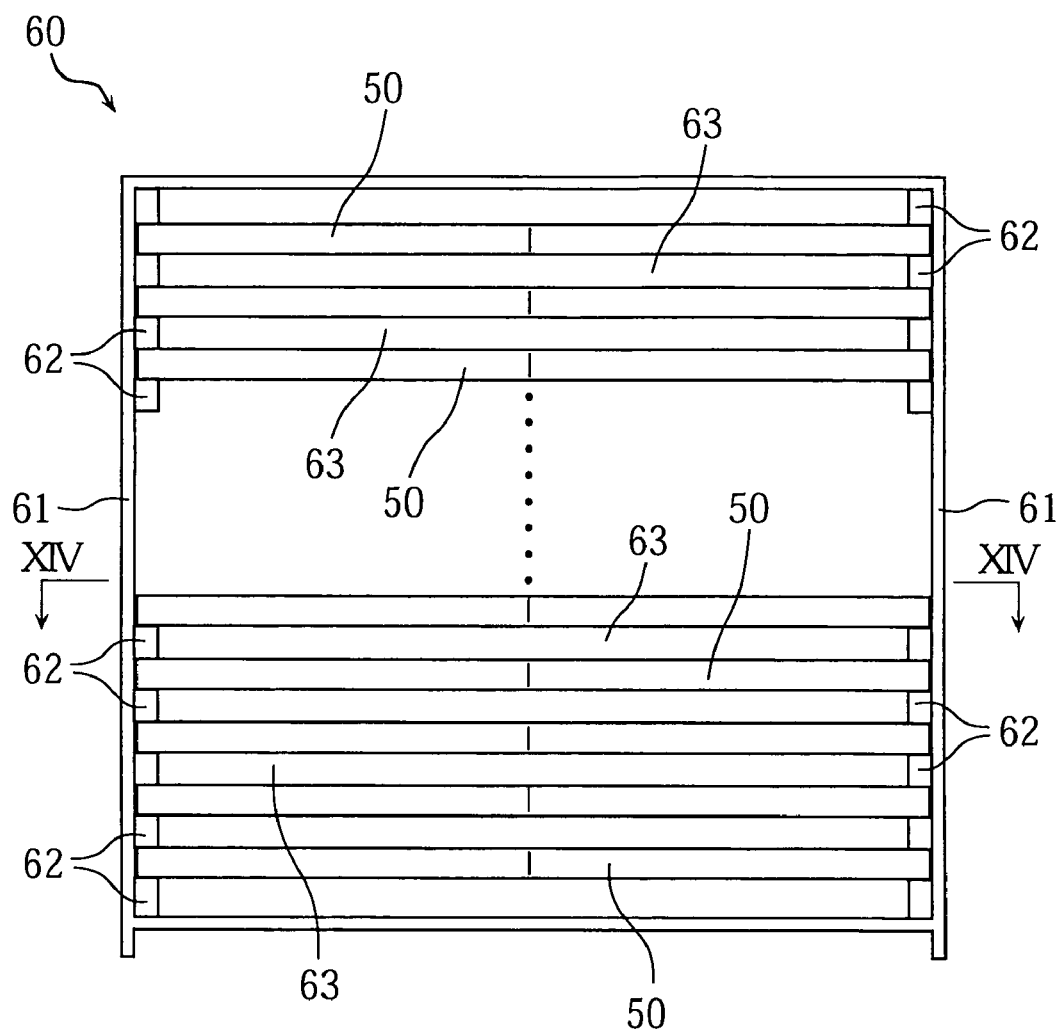
FIG. 13 is a front view showing an accommodation box used for the storage medium library of FIG. 10.
Figure 14:
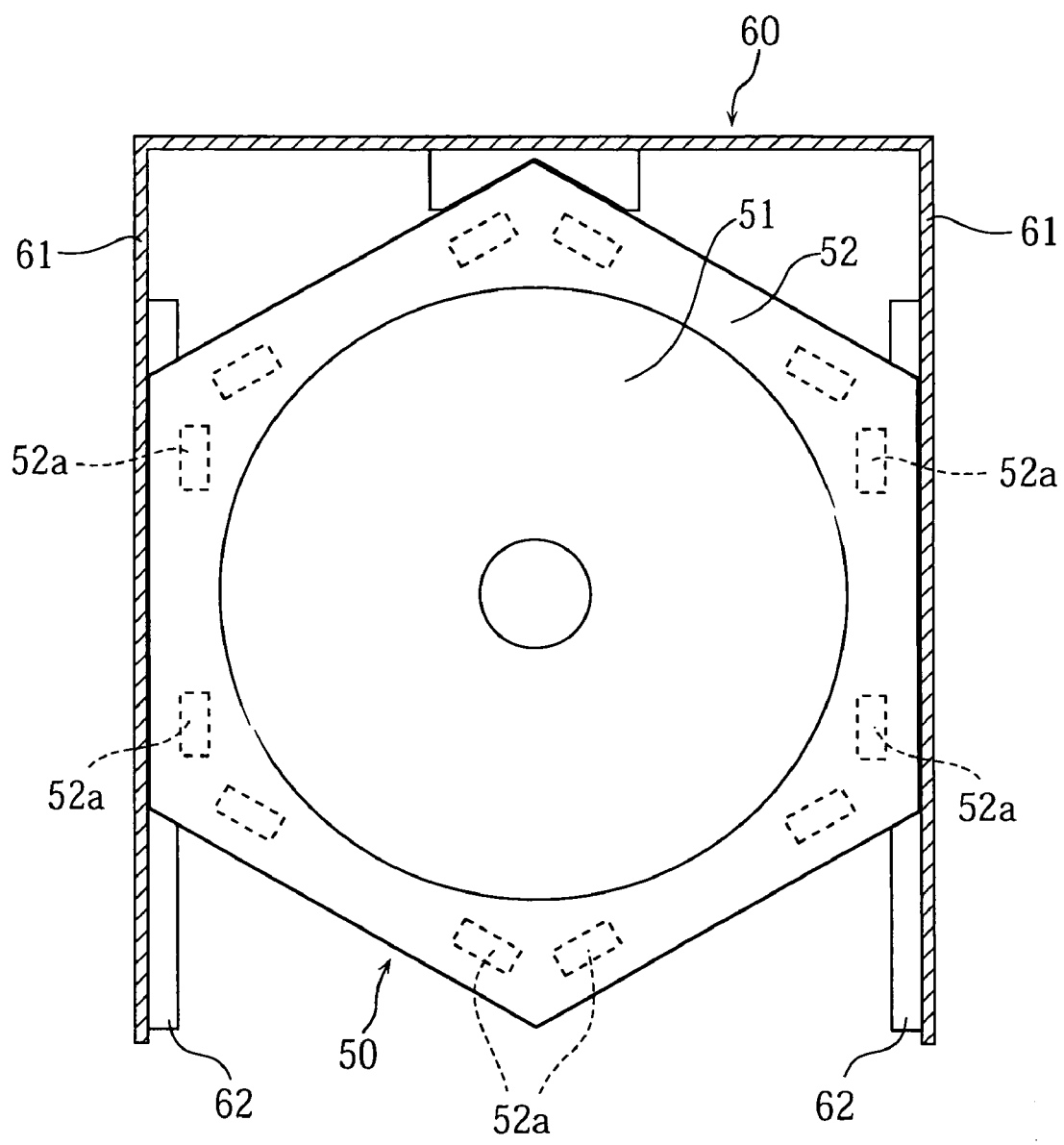
FIG. 14 is a sectional view taken along lines XIV-XIV in FIG. 13.

The accommodation box 60 can retain a number of storage medium plates 50, as shown in FIGS. 13 and 14. Specifically, the box 60 includes a pair of side walls 61, and a plurality of ledges 62 fixed to the side walls 61. As seen from the figures, a pair of ledges 62 (arranged at the same height, one ledge secured to one side wall 61, while the other ledge secured to the other side wall 61) supports one plate 50 from below by directly contacting the handling section 52 of the plate. In the accommodation box 60, the plurality of plates 50 are arranged in the vertical direction, with a space 63 left between any two adjacent plates 50 for allowing the insertion of disk transferring arms. The accommodation box 60 and the plates 50 constitute a storage medium magazine.

The disk changer 70 is provided for transferring a storage medium plate 50 between the accommodation box 60 and the drive unit 30. The disk changer 70 includes a pair of disk transferring arms 71-72, a pair of claws 73, another pair of claws 74, and an elevating mechanism 75.

Figure 15:
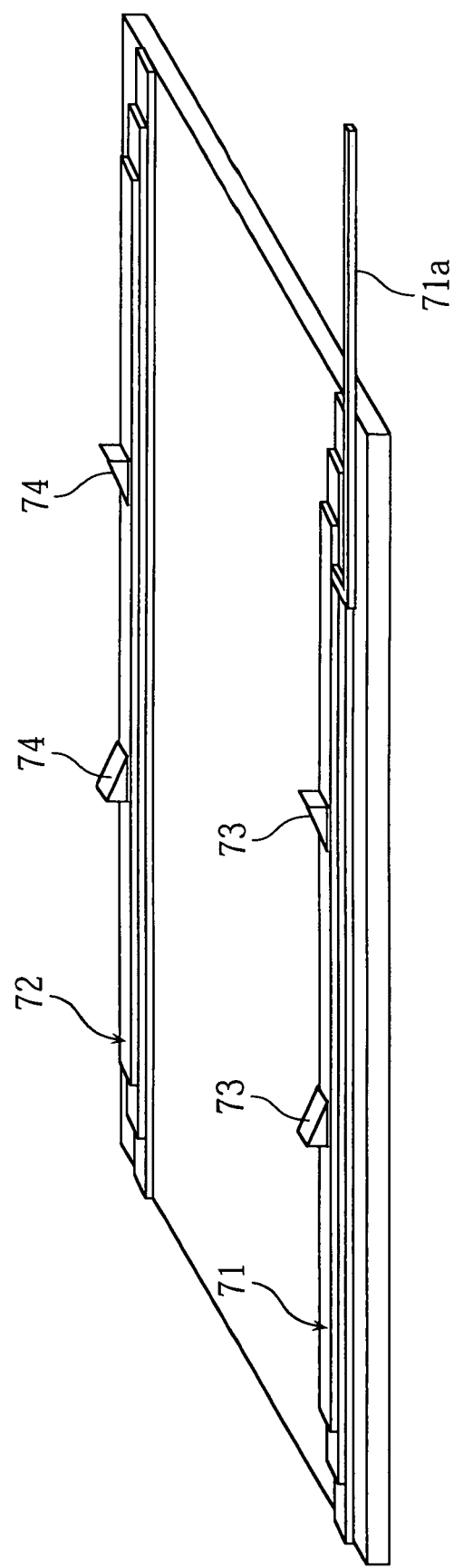
FIG. 15 is a perspective view showing a principal arrangement of the plate changer used for the library shown in FIG. 10.

As shown in FIG. 15, each of the arms 71, 72 consists of a plurality of bars of different lengths stacked vertically (three bars shown in the figure). In each arm 71, 72, the bars are slidable relative to each other in the longitudinal direction of the arm, so that the arm can become longer in the forward direction (to the left in FIG. 15) or in the rearward direction (to the right). The arms 71, 72 are supported by a flat, horizontal surface. The arm 71 is provided with a posture adjusting extension 71a projecting beyond the arm 72 toward the drive unit 30 (to the right in FIG. 15). The two arms 71, 72 are cooperatively extendable toward the accommodation box 60 or toward the drive box 30. Such operation of the arms 71, 72 is effectuated by a driving mechanism (not shown) which in turn is controlled by a non-illustrated controller.

The claws 73 are provided on the arm 71 in an upwardly protruding manner. Likewise, the claws 74 are provided on the other arm 72 in an upwardly protruding manner. These two pairs of claws can be brought into engagement with the appropriate recesses 52a formed in the handling section 52 of the plate 50, as will be described below with reference to FIG. 16B, for example. In the illustrated example, the claws 73 and 74 are stationary relative to the arms 71 and 72, respectively, so that they cannot be retracted into the arms.

The elevating mechanism 75 raises or lowers the arms 71, 72 to a desired height. Such operation of the elevating mechanism 75 is effectuated by a driving mechanism (not shown) which in turn is controlled by the non-illustrated controller.

The drive unit 30, the base B and the library housing H of the second embodiment are the same as those described above for the first embodiment.

The accommodation box 60, the drive unit 30 and the disk changer 70 are mounted on the base B and accommodated in the library housing H. The box 60 is detachable from the base B and can be replaced with another one.

Figure 16A:
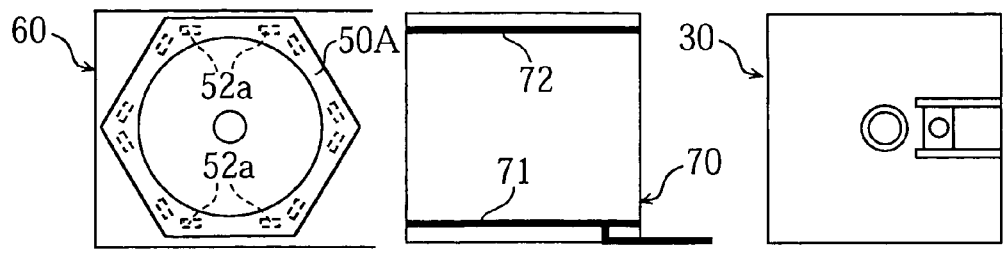
FIGS. 16A-16E illustrate how a storage medium plate is transferred from the accommodation box to the drive unit in the library of the second embodiment.

FIGS. 16A-16E illustrate how a selected storage medium plate 50 is transferred from the accommodation box 60 to the drive unit 30 during the operation of the library X2. Initially, as shown in FIG. 16A, the selected plate 50A to be transferred is retained at a certain height in the accommodation box 60. This height (the vertical location of the selected plate 50A) may be detected by the non-illustrated controller. Based on the detection, the changer unit 70 is moved vertically (up or down) by the elevating mechanism 75 so that the arms 71, 72 of the changer 70 are brought to an appropriate height generally the same as the vertical location of the selected plate 50A. Precisely, the arms 71, 72 are brought to a height which is lower by a predetermined amount than the vertical location of the plate 50A.

Figure 16B:
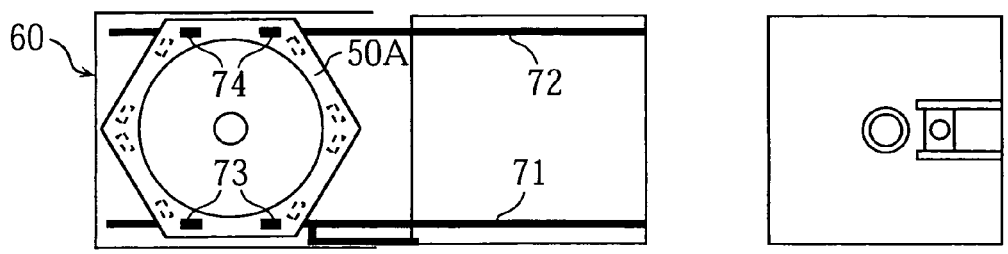

Then, as shown in FIG. 16B, the arms 71, 72 are extended synchronously into the accommodation box 60. Specifically, the arms 71, 72 are extended into one of the spaces 63 (see FIG. 13) that is located directly under the selected plate 50A. At this stage, the arms 71, 72 proceed well under the plate 50A so that the protruding claws 73, 74 do not contact the plate 50A. After the arms 71, 72 become sufficiently long, the arms 71, 72 are raised by the elevating mechanism 75 until they come into contact with the second surface 50b of the plate 50A, thereby bringing the four claws 73, 74 into engagement with the four appropriate recesses 52a of the plate 50A. In the illustrated example, the claws 73 come into engagement with two recesses 52a arranged along one of the paired sides of the hexagon that extend in parallel to the arm 71 or 72, while the claws 74 come into engagement with another two recesses 52a arranged along the other of the paired sides.

Figure 16C:
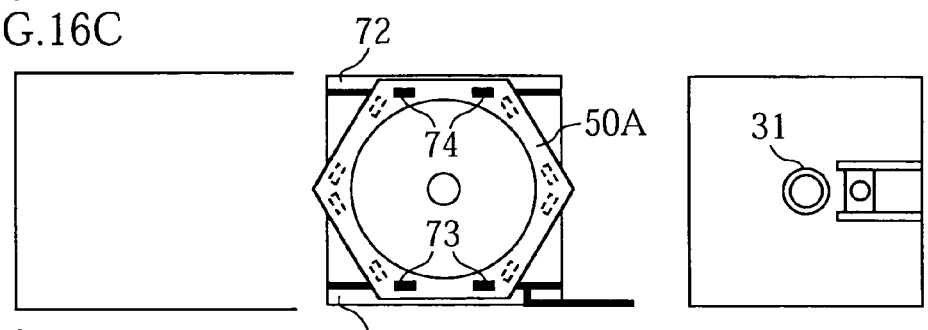

Then, as shown in FIG. 16C, the arms 71, 72 are contracted synchronously, with the claws 43, 44 held in engagement with the recesses 52a. In this process, the plate 50A is supported directly by the arms 73, 74.

Figure 16D:
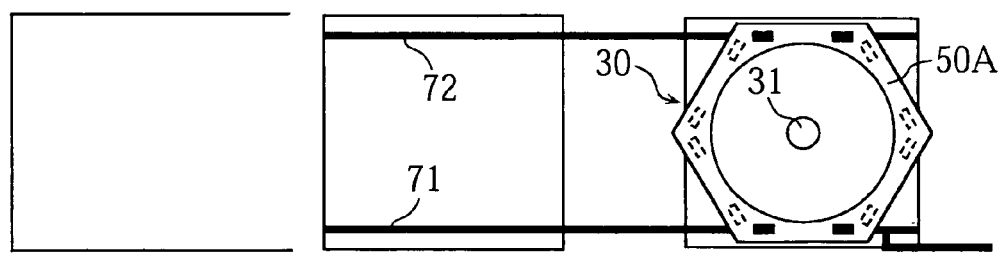

Then, as shown in FIG. 16D, the arms 71, 72 are extended toward the drive unit 30 to bring the plate 50A to a position immediately above the spindle motor 31. Then, the arms 71, 72 are lowered by the elevating mechanism 75 to pull the claws 73, 74 out of the recesses 52a. As a result, the weight of the plate 50A is entirely supported by the motor 31.

Figure 16E:
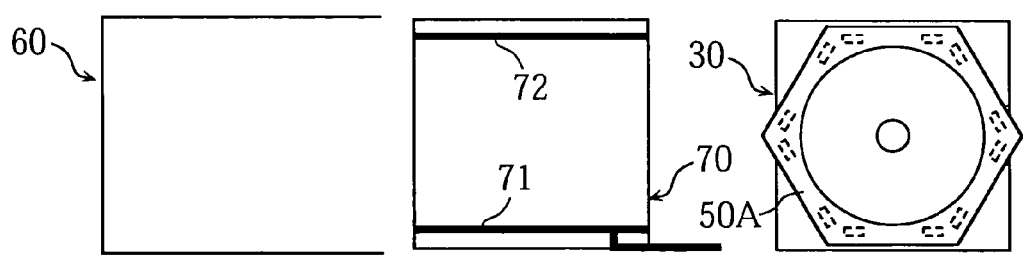

Then, as shown in FIG. 16E, the arms 71, 72 are synchronously contracted, to complete the transfer of the plate 50A from the box 60 to the drive unit 30. Thereafter, the drive unit 30 may write data to the plate or retrieve data from the plate.

FIGS. 17A-17E illustrate how the plate 50A is transferred back from the drive unit 30 to the accommodation box 60.

Figure 17A:
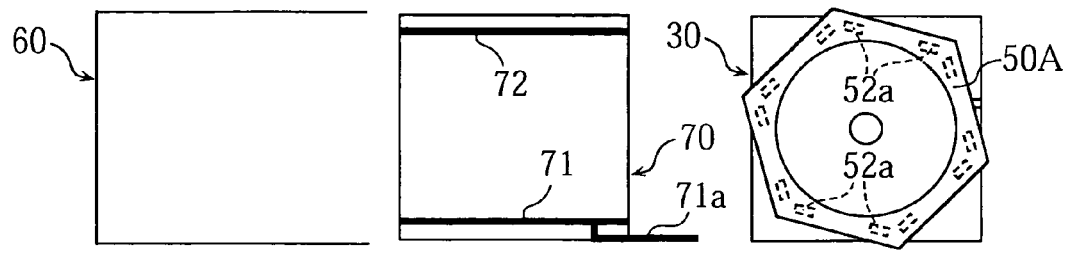
FIGS. 17A-17E illustrate how the storage medium plate is transferred back from the drive unit to the accommodation box in the library of the second embodiment.

In the initial state, as shown in FIG. 17A, the plate 50A is supported by the drive unit 30. The changer unit 70 is moved vertically by the elevating mechanism 75 to bring the arms 71, 72 to the height corresponding to the known vertical location of the plate 50A.

Figure 17B:
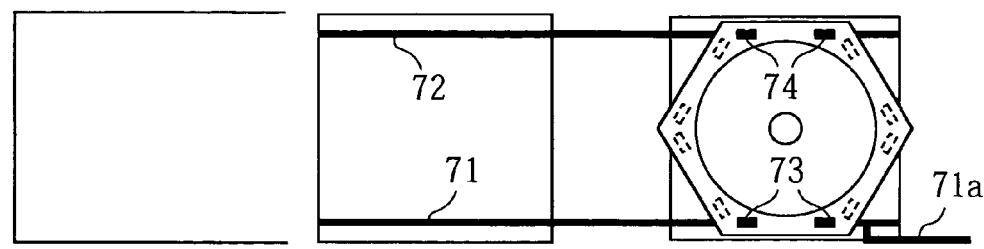

Then, as shown in FIG. 17B, the arms 71, 72 are extended synchronously toward the drive unit 30 until they become long enough to bring the claws 71, 72 to come directly under the appropriate recesses 52a into which the claws will be inserted. For this process, the plate 50A may initially be skew with respect to the arms 71, 72, as shown in FIG. 17A. Even in such a case, the posture adjusting extension 71a comes into contact with one side of the hexagonal plate 50A and pushes it as the arms 71, 72 are being extended. Accordingly, the plate 50A is rotated about its center, to be brought into a position in which two opposite sides of the plate become parallel to the arms 71, 72 (FIG. 17B). After the skew of the plate 50A is corrected and the arms 71, 72 are extended sufficiently, the arms 71, 72 are raised by the elevating mechanism 75 until they come into contact with the second surface 50b of the plate 50A. Thus, the claws 73, 74 come into engagement with the four appropriate recesses 52a of the plate 50A.

Figure 17C:
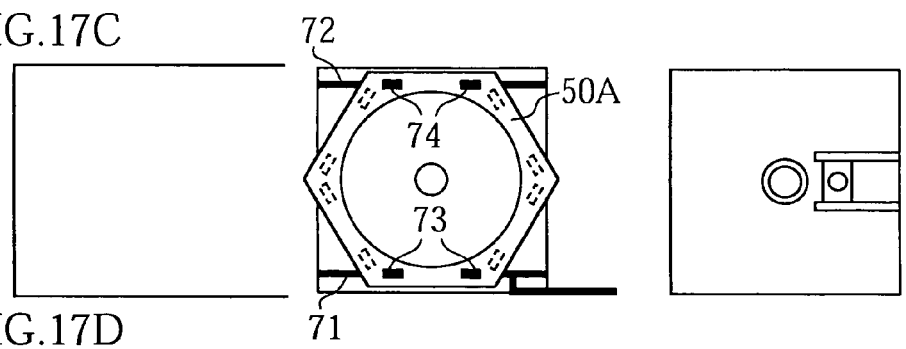

Then, as shown in FIG. 17C, the arms 71, 72 are contracted synchronously, with the claws 73, 74 held in engagement with the recesses 52a.

Figure 17D:
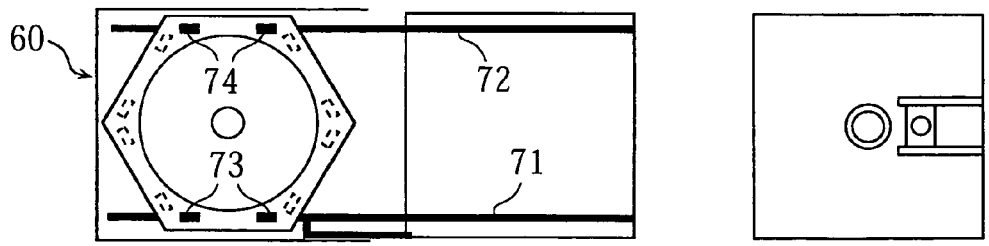

Then, as shown in FIG. 17D, the arms 41, 42 carrying the plate 50A are extended into the accommodation box 60 to shift the plate 50A to the prescribed storage location in the box 60. Thereafter, the arms 71, 72 are lowered by the elevating mechanism 75 to pull the claws 73, 74 out of the recesses 52a.

Figure 17E:
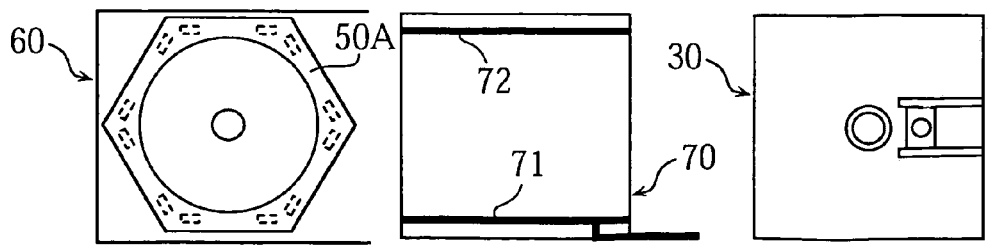

Then, as shown in FIG. 17E, the arms 71, 72 are contracted synchronously, to complete the transfer of the plate 50A from the drive unit 30 to the box 60.

In the above-described manner again, it is possible to protect the recording section 51 of the plate 50A from mechanical damage in the retainment and transfer of the plate, since the recording section 51 does not contact the support ledges 50 in the box 60 nor the arms 71, 72 of the disk changer 70. Further, the library X2 of the second embodiment can be made compact, like the library X1 of the first embodiment, since no medium-carrying trays are used.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

The invention claimed is:

1. A storage medium library comprising:
   a plurality of storage medium plates to be rotated for recording or retrieving information to or from the storage medium plates;
   an accommodation unit for retaining the storage medium plates;
   a drive unit for recording or retrieving information with respect to the storage medium plates; and
   a plate transfer mechanism for transferring the storage medium plates between the accommodation unit and the drive unit;
   wherein each of the storage medium plates includes a recording section and a handling section formed integral with the recording section to produce a one piece which is rotatable as one piece for recording or retrieving information to or from said each storage medium plate, the handing section being formed with a plurality of engagement recesses, wherein the accommodation unit includes a plurality of support members coming into contact with the handling sections of the respective storage medium plates for supporting the storage medium plates, wherein the transfer mechanism includes a movable unit for transferring the storage medium plates between the accommodation unit and the drive unit, the movable unit being provided with claws coming into engagement with the recesses of the handling sections of the respective storage medium plates, wherein each storage medium plate comprises a recording section and a handling section formed integral with the recording section for rotation therewith, the handling section being formed with a plurality of recesses into which claws are inserted when the storage medium plate is transferred, wherein the accommodation unit is provided with supporting members coming into contact with the handling sections of the respective storage medium plates for supporting the plates.

2. The library according to claim 1, wherein the storage medium plates each comprise a first surface, a second surface opposite to the first surface, and a plurality of side surfaces extending between the first surface and the second surface, the recording section of each storage medium plate being circular, the handling section of said each storage medium plate surrounding the circular recording section.

3. The library according to claim 2, wherein each of the recesses in the handling section of each storage medium plate is open both in a corresponding one of the side surfaces of said each storage medium plate and in the second surface of said each storage medium plate.

4. The library according to claim 2, wherein each of the recesses in the handling section of each storage medium plate is open only in the second surface of said each storage medium plate.

5. The library according to claim 2, wherein the first and the second surfaces of each storage medium plate are a regular polygon having an even number of sides.

6. The library according to claim 5, wherein the regular polygon is hexagonal or octagonal.

7. The library according to claim 5, wherein the engagement recesses in each storage medium plate are allotted equally in number to each side of the regular polygon.

8. The library according to claim 1, wherein the movable unit of the transfer mechanism comprises a first arm and a second arm each of which is provided with claws coming into engagement with the recesses in the handling section of each storage medium plate, both the first arm and the second arm being extendable toward any one of the accommodation unit and the drive unit.

9. The library according to claim 8, wherein the first arm is provided with an extension that projects beyond the second arm toward the drive unit so that the extension comes into contact with a storage medium plate supported on the drive unit earlier than the second arm.

10. A storage medium magazine used for a storage medium library, the magazine comprising:

a plurality of storage medium plates to be rotated for recording or retrieving information to or from the storage medium plates; and an accommodation unit for retaining the storage medium plates;

wherein each storage medium plate comprises a recording section and a handling section formed integral with the recording section, to produce a one piece which is rotatable as one piece for recording or retrieving information to or from each storage medium plate, the handling section being formed with a plurality of recesses into which claws are inserted when the storage medium plate is transferred, wherein the accommodation unit is provided with supporting members coming into contact with the handling sections of the respective storage medium plates for supporting the plates.

* * * * *

UNITED STATES PATENT AND TRADEMARK OFFICE
CERTIFICATE OF CORRECTION

| | | |
|---|---|---|
| PATENT NO. | : 7,272,839 B2 | |
| APPLICATION NO. | : 10/876911 | |
| DATED | : September 18, 2007 | |
| INVENTOR(S) | : Moribe et al. | |

It is certified that error appears in the above-identified patent and that said Letters Patent is hereby corrected as shown below:

Col. 11, lines 14-23, delete line 14 beginning with "wherein each storage medium…" through line 23 ending in "supporting the plates."

Signed and Sealed this

Tenth Day of June, 2008

JON W. DUDAS
*Director of the United States Patent and Trademark Office*